US010026989B2

(12) United States Patent
Takada et al.

(10) Patent No.: US 10,026,989 B2
(45) Date of Patent: Jul. 17, 2018

(54) ALL SOLID LITHIUM BATTERY

(75) Inventors: Kazunori Takada, Tsukuba (JP); Xiaoxiong Xu, Tsukuba (JP); Tsuyoshi Ohnishi, Tsukuba (JP); Isao Sakaguchi, Tsukuba (JP); Ken Watanabe, Tsukuba (JP); Yasushi Tsuchida, Susono (JP); Yukiyoshi Ueno, Gotenba (JP); Koji Kawamoto, Miyoshi (JP)

(73) Assignees: NATIONAL INSTITUTE FOR MATERIALS SCIENCE, Ibaraki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 13/636,961

(22) PCT Filed: Mar. 23, 2011

(86) PCT No.: PCT/JP2011/056989
§ 371 (c)(1),
(2), (4) Date: Nov. 14, 2012

(87) PCT Pub. No.: WO2011/125499
PCT Pub. Date: Oct. 13, 2011

(65) Prior Publication Data
US 2013/0065135 A1    Mar. 14, 2013

(30) Foreign Application Priority Data
Mar. 31, 2010   (JP) .................................. 2010-082678

(51) Int. Cl.
*H01M 10/0562* (2010.01)
*H01M 4/131* (2010.01)
(Continued)

(52) U.S. Cl.
CPC ....... *H01M 10/0562* (2013.01); *H01M 4/131* (2013.01); *H01M 4/362* (2013.01);
(Continued)

(58) Field of Classification Search
CPC ............... H01M 4/131; H01M 10/052; H01M 10/0562; H01M 4/362; H01M 4/366; H01M 4/525
(Continued)

(56) References Cited

U.S. PATENT DOCUMENTS

2001/0036578 A1* 11/2001 Nishida et al. ............ 429/231.3
2002/0076613 A1*  6/2002 Lee ..................... H01M 4/0402
                                                       429/231.1
(Continued)

FOREIGN PATENT DOCUMENTS

| CN | 1595687 A | 3/2005 |
|---|---|---|
| JP | A-2008-103204 | 5/2008 |

(Continued)

OTHER PUBLICATIONS

Cao et al., "LiAlO2-coated LiCoO2 as cathode material for lithium ion batteries", Solid State Ionics, 176 (2005) 911-914.*
(Continued)

*Primary Examiner* — Sarah A Slifka
*Assistant Examiner* — Brian R Ohara
(74) *Attorney, Agent, or Firm* — Oliff PLC

(57) ABSTRACT

An Object of the invention is to obtain an all solid lithium battery having an excellent output performance. To achieve the object, a sulfide based solid electrolyte is used as an electrolyte; an oxide containing lithium, a metal element that acts as a redox couple, and a metal element that forms an electron-insulating oxide is used as a cathode active material; and the concentration of the metal element that forms the electron-insulating oxide on the surface of the cathode
(Continued)

active material (oxide) that is in contact with the sulfide solid electrolyte is made high.

6 Claims, 12 Drawing Sheets

(51) Int. Cl.
    *H01M 4/36*     (2006.01)
    *H01M 4/525*     (2010.01)
    *H01M 10/052*     (2010.01)
    *H01M 4/02*     (2006.01)

(52) U.S. Cl.
    CPC ........... H01M 4/366 (2013.01); H01M 4/525 (2013.01); H01M 10/052 (2013.01); *H01M 2004/028* (2013.01)

(58) Field of Classification Search
    USPC .................................................. 429/322, 207
    See application file for complete search history.

(56) References Cited

U.S. PATENT DOCUMENTS

| | | | |
|---|---|---|---|
| 2004/0258836 A1* | 12/2004 | Besenhard | B82Y 30/00 427/180 |
| 2009/0081554 A1* | 3/2009 | Takada | H01M 4/13 429/322 |
| 2010/0047691 A1* | 2/2010 | Kawakami | 429/221 |
| 2010/0216030 A1 | 8/2010 | Maeda | |

FOREIGN PATENT DOCUMENTS

| JP | A-2008-135379 | 6/2008 |
|---|---|---|
| JP | A-2010-192373 | 9/2010 |
| WO | WO 2007/004590 A1 | 1/2007 |

OTHER PUBLICATIONS

Takada, Kazunori et al., "Interfacial modification for high-power solid-state lithium batteries," Solid State Ionics, 2008, vol. 179, pp. 1333-1337.
International Search Report issued in International Patent Application No. PCT/JP2011/056989 dated Jul. 5, 2011.
Ohta et al., "$LiNbO_3$-coated $LiCoO_2$ as cathode material for all solid-state lithium secondary batteries," Electrochemistry Communications 9 (2007) pp. 1486-1490.
Sakuda et al., "Electrochemical performance of all-solid-state lithium secondary batteries improved by the coating of $Li_2O$—$TiO_2$ electrode," Journal of Power Sources 195 (2010) pp. 599-603.
Partial English Translation of Chinese Office Action dated Apr. 30, 2014 regarding CN 1595687.

* cited by examiner

AFTER PULVERIZATION

AFTER HEATING FOR 30 HRS

HEATING TIME (HOURS)

US 10,026,989 B2

ALL SOLID LITHIUM BATTERY

TECHNICAL FIELD

The present invention relates to an all solid lithium battery with high safety in which a nonflammable electrolyte, i.e., an inorganic solid electrolyte, is used. More specifically, it relates to obtainment of high output from an all solid lithium battery which contains a sulfide as an inorganic solid electrolyte.

BACKGROUND ART

A commercially available conventional lithium battery contains an organic liquid electrolyte in which an inflammable organic solvent is used, and therefore it is required to have a safety device to inhibit temperature increase at the time of short circuit or an improvement in structure and material for preventing short circuit. Meanwhile, an all solid battery in which a liquid electrolyte is changed to a solid electrolyte does not use any inflammable organic solvent in the battery, and therefore it is believed that a safety device can be simplified, and thus it is excellent in terms of production cost or productivity. In addition, an electronic circuit can be integrated by preparing a battery as a thin film. Moreover, because an inorganic solid electrolyte has ion selectivity, when an inorganic solid electrolyte is used, reliability of a battery including cycle lifetime, storage lifetime, or the like can be enhanced.

An all solid battery has excellent characteristics as described above. However, in general, the power density is lower than that of the liquid electrolyte systems, and this drawback must be overcome if the battery is to be used as general-purpose batteries, in particular.

In order to increase the output of the all solid lithium secondary battery, a solid electrolyte having high ion conductivity must be used. Solid electrolytes exhibiting an ion conductivity of $10^{-3}$ S/cm or more at room temperature include oxides such as $LiTi_2(PO_4)_3$ having a NASICON structure, its analogue compounds, and $(Li,La)TiO_3$ having a perovskite structure; and lithium nitride. However, the oxides above are compounds containing titanium which is susceptible to electrochemical reduction. Thus, when these oxides are used as the electrolyte of the all solid lithium battery, electronic conduction is generated according to the reduction of titanium and the compound can no longer function as an electrolyte. Meanwhile, lithium nitride has a decomposition voltage as low as 0.45 V and cannot be used as an electrolyte for a high-voltage lithium battery. In contrast to these solid electrolytes having low electrochemical stability, sulfide based solid electrolytes have both high ion conductivity and electrochemical stability.

However, according to the present inventors' review on electrochemical stability of the sulfide based solid electrolytes, it has been found that although the sulfide based solid electrolyte does not undergo continuous decomposition reaction upon application of a high potential, a high-resistance layer is formed at the interface at which the electrolyte contacts the cathode active material that shows electrode reaction at a high potential. It has also been found that this high resistance layer is the cause of incapacity to generate high output current. To solve the problems, by having a buffer layer of a material which functions as an oxide based solid electrolyte, such as $Li_4Ti_5O_{12}$ or $LiNbO_3$, between a sulfide solid electrolyte and a transition metal oxide such as $LiCoO_2$ as a cathode active material, the inventors have succeeded in enhancing output performance of an all solid lithium battery so that it is comparable to a commercially available lithium ion battery (Patent Literature 1).

When an electrode active material contacts an electrolyte, migration of movable ions occurs in the contact interface due to a difference in electrochemical potential of the movable ions of these materials. Although the electrochemical potential of a lithium ion in a sulfide based solid electrolyte has not been determined so far, it is 2.5 V or less versus a lithium electrode, which is the oxidation potential of the sulfide ions. When such a solid electrolyte is brought into contact with a cathode active material of 4 V or more versus a lithium electrode, migration of lithium ions from the sulfide solid electrolyte to the cathode active material occurs, and as a result, equilibrium at interface is reached. In this case, since the difference in electrochemical potential of lithium ion is large between them, degree of mass migration of lithium ions is big. Further, since most of the cathode active materials have electron conduction, concentration gradient of movable ions is not likely to occur inside of them. Accordingly, a space charge layer depleted with lithium ions is significantly developed at the sulfide solid electrolyte side of the interface, and thus equilibrium is reached. Since very few lithium ions are present as a charge carrier in the space charge layer, it results in high resistance in an all solid lithium battery and impairs output performances.

In other words, the reason of forming a high resistance layer at an interface between a cathode active material and a sulfide solid electrolyte is, since the nearest ions are different between the cathode active material which is an oxide and the solid electrolyte which is a sulfide, the electrochemical potential of lithium ion is significantly different and the cathode active material has electron conduction. Thus, to prevent formation of such high resistance layer, the cathode active material and the sulfide solid electrolyte need to be brought into contact with each other at an interface at which those two conditions are not simultaneously satisfied.

For such reasons, according to Patent Literature 1, an oxide based solid electrolyte layer is interposed between $LiCoO_2$ and a sulfide solid electrolyte. When an oxide based solid electrolyte is interposed between $LiCoO_2$ and a sulfide solid electrolyte, two interfaces, i.e., an interface between $LiCoO_2$ and an oxide based solid electrolyte and an interface between an oxide based solid electrolyte and a sulfide solid electrolyte, are generated.

The former is an interface at which oxides are in contact with each other and there is no big difference in electrochemical potential of lithium ions, which is a driving force for forming a space charge layer. Although the latter is an interface at which oxide and sulfide are in contact with each other, as being an interface between electron insulators, the space charge layer is not well developed into Schottky type, and thus, by using the oxide based solid electrolyte layer as a buffer layer for the interface, $LiCoO_2$ and sulfide solid electrolytes can be brought into contact with each other under a state in which development of a space charge layer functioning as a high resistance component is inhibited, and as a result, output performances of an all solid lithium battery using a sulfide solid electrolyte can be improved greatly.

To have a large area of an interface between an electrode active material and a solid electrolyte at which an electrochemical reaction occurs, electrodes of an all solid lithium battery are generally a mixture of electrode active material powder and solid electrolyte powder. In this regard, in Patent Literature 1, a structure in which an oxide based solid electrolyte layer is interposed between an electrode active material and a sulfide solid electrolyte, which is obtained by forming a thin film of an oxide based solid electrolyte layer on surface of electrode active material powder by spray method and mixing it with a sulfide solid electrolyte powder, is disclosed.

According to the process, for forming a buffer layer of oxide based solid electrolyte by a spraying method, a method of forming an oxide based solid electrolyte layer including that alkoxide is used as a precursor for producing oxide based solid electrolyte, its alcohol solution is sprayed onto active material powder, and then the alkoxide is thermally decomposed by heating is employed. However, when such method is employed, although output performances of an all solid lithium battery are greatly improved, the problems to be solved as follows are yielded.

First, a process of forming a buffer layer by a spraying method is a batch type process with poor large scale productivity and also the alkoxide as a precursor for a buffer layer is prone to hydrolysis, difficult to handle, and expensive. Further, thickness of a buffer layer described as preferable in Patent Literature 1 is 100 nm or less, and especially, for obtaining an all solid lithium battery having high output performances, the thickness is very thin like 10 nm or so. For uniform formation of such thin layer on surface of an electrode active material particle, it is necessary to follow strictly the various conditions for forming a buffer layer.

Further, the buffer layer is formed by thermal decomposition of alkoxides, but during a heating treatment for performing thermal decomposition, inter-diffusion occurs at certain level between an electrode active material and a buffer layer. However, since the thickness of the buffer layer is desirably very thin, the inter-diffusion may yield loss of the buffer layer (K. Takada, N. Ohta, L. Zhang, K. Fukuda, I. Sakaguchi, R. Ma, M. Osada, and T. Sasaki, Solid State Ionics, 179, 1333-1337 (2008)), and thus it is necessary to perform very precisely the temperature control or the like for thermal decomposition of alkoxides.

CITATION LIST

Patent Literature

Patent Literature 1: WO2007/004590

SUMMARY OF INVENTION

Technical Problem

Forming a buffer layer to improve output performances of an all solid lithium battery is a batch type process which has poor large scale productivity and requires fine and precise control. Further, the raw materials used are expensive, and thus the production cost is high.

An object of the invention is to solve the problems described above and to provide an all solid lithium secondary battery with excellent output performance according to an inexpensive method with excellent large scale productivity.

Solution to Problem

The present invention provides an all solid lithium battery using a lithium ion conductive solid electrolyte as an electrolyte, wherein the lithium ion conductive solid electrolyte comprises a sulfide as a main component; the cathode active material is a composite oxide containing a transition metal element that acts as a redox couple when the all solid lithium battery is under operation, lithium, and at least one metal element other than those; the metal element other than lithium and a transition metal element that acts as a redox couple in the composite oxide is a metal element which forms an electron-insulating composite oxide with lithium; and the concentration of the metal element in a region that is in contact with the sulfide solid electrolyte is higher than the concentration inside the composite oxide.

Further, as for the metal element other than a transition metal and lithium, aluminum is used.

Further, compositional ratio of the metal element other than the transition metal element and lithium compared to the total composition of the transition metal element that acts as a redox couple in composite oxide and the metal element other than the transition metal element and lithium is between 0.05 and 0.20.

Further, compositional ratio of the metal element other than the transition metal element and lithium compared to the total composition of the transition metal element that acts as a redox couple in composite oxide and the metal element other than the transition metal element and lithium in a region at which a contact is made with the lithium ion conductive solid electrolyte which contains the sulfide as a main component is at least five times greater than that of the inside.

Still further, as for the transition metal element that acts as a redox couple, those showing a redox reaction at potential of 3 V or more versus a lithium electrode are used.

DESCRIPTION OF EMBODIMENTS

Figure 1:
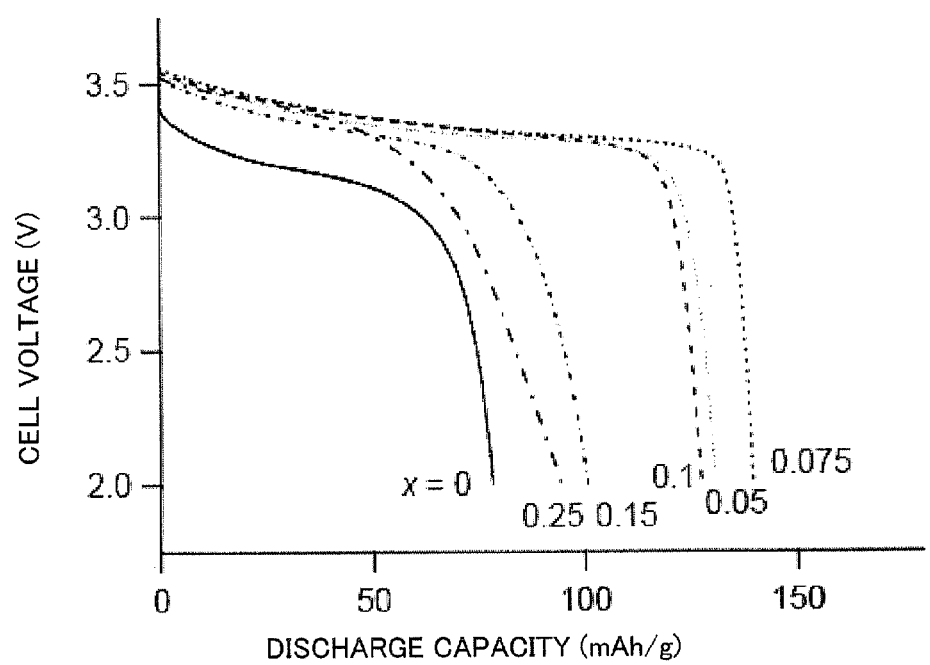
FIG. 1 is a drawing for illustrating a discharge curve of an all solid lithium battery according to one Example of the invention. In the figure, "x" represents composition of aluminum in composite oxide and it corresponds to "x" in $LiCo_{1-x}Al_xO_2$ which indicates the composition of composite oxide.

The invention is based on the finding that, by adding a metal element which can form electron-insulating composite oxide with lithium to a composite oxide of a transition metal and lithium that acts as a cathode active material of a lithium battery, a portion acting as a buffer layer is automatically formed on the surface of oxide of lithium and transition metal particles.

As a composite oxide containing, as a main component, lithium and a transition metal that acts as a cathode active material of a lithium battery, $LiCoO_2$, $LiNiO_2$, $LiMn_2O_4$ or the like are known. For example, when $LiCoO_2$ is added with aluminum as a metal element which forms an electron-insulating composite oxide with lithium, in a range in which aluminum composition is small, most of added aluminum replaces the cobalt site of $LiCoO_2$ to yield a solid solution represented by $LiCo_{1-x}Al_xO_2$. Simultaneously, part of the aluminum added is segregated on the surface, thus forming a layer containing aluminum with high concentration on surface of the particles. Since the main component of the layer is a composite oxide of lithium and aluminum such as $LiAlO_2$, the layer has an electron insulating property and also exhibits lithium ion conduction, even though the conductivity is low. Since this layer acts as a buffer layer between a cathode active material and a sulfide solid electrolyte as described in Patent Literature 1, by using the material as a cathode material of an all solid lithium battery, an all solid lithium battery with low electrode resistance and high output performances can be provided.

For segregating a layer that acts as a buffer layer on a surface, a metal element for forming electron-insulating composite oxide with lithium, which forms a surface segregating layer that acts as a buffer layer, can be introduced to a composite oxide of lithium and a transition metal that acts as a redox couple during operation of an all solid lithium battery. That is, according to the example given above, part of Co in $LiCoO_2$ is replaced with aluminum so that a composite oxide layer containing aluminum and lithium that acts as a buffer layer is formed on the surface of particles. As for the metal element, an element capable of replacing a transition metal site in the composite oxide of lithium and transition metal that acts as a cathode active material of an all solid lithium battery is preferably selected.

When an element incapable of replacing a transition metal site in the composite oxide is added, a mixture state containing the composite oxide of lithium and a transition metal and oxide of added element or the composite oxide of lithium and added element is obtained. In such mixture, since each phase has a particulate shape to have lower surface energy, it is difficult to achieve that the surface of the composite oxide of lithium and a transition metal that acts as an electrode active material is coated with oxide of added element or the composite oxide of lithium and added element.

On the other hand, when an element capable of replacing a transition metal site in the composite oxide is added, most of the element are used for replacing a transition metal site in the composite oxide to form a solid solution, and, based on surface segregation, part of them can form an oxide layer or a composite oxide layer that acts as a buffer layer. Since such layer is formed in an equilibrium state between a solid solution reaction at a transition metal site and a reaction for forming surface segregated oxide, a state of having particle surface covered with a segregation layer is achieved with stability. Further, even for a case in which a surface without a segregation layer is newly exposed by undergoing a pulverization process or the like after synthesis of an active material, it is possible to form again a surface segregation layer by adding a heating process after the pulverization process, for example, and thus an electrode with low resistance can be prepared.

Meanwhile, even for a case in which an element capable of replacing the lithium site in the composite oxide is added, it is possible to achieve that the surface of oxide of lithium and transition metal is coated with the same surface segregation layer as described above. However, there is a problem in that, as the lithium site in the composite oxide of lithium and transition metal is replaced with the element, diffusion of lithium ions in the composite oxide is inhibited. For such reasons, as a metal element for forming a surface segregation layer that acts as a buffer layer, an element capable of replacing the transition metal site in the composite oxide of lithium and transition metal is preferable.

In order for the element to replace the site of a transition metal element, it is necessary that the element has ionic radius close to that of a transition metal element that acts as a redox couple. The cobalt or nickel in $LiCoO_2$ or $LiNiO_2$ and $Mn^{3+}$ and $Mn^{4+}$ in $LiMn_2O_4$ are all hexa-coordinated with oxygen, and each has ionic radius of 0.545 Å, 0.56 Å, 0.53 Å, and 0.58 Å, respectively. Thus, as for the metal element for forming electron-insulating composite oxide with lithium, those having ionic radius close to that of the transition metal at the site of hexa-coordination with oxygen are preferable. Specifically, $Al^{3+}$ (ionic radius of 0.535 Å at the site of hexa-coordination with oxygen), $Ge^{4+}$ (ditto, 0.530 Å), $V^{5+}$ (ditto, 0.540 Å), and the like are preferable. Of these, aluminum is most preferable in that it is a light element which hardly causes reduction in gravimetric and volumetric energy density and can easily replace the transition metal element site described above.

Regarding the total composition of a transition metal element and a metal element other than the transition metal and lithium, ratio of the latter is preferably in the range of 5% to 20% in terms of element ratio. When the ratio is less than 5%, even for a case of having surface segregation, concentration of the metal element for forming an electron-insulating composite oxide on surface is low, and therefore a surface fully functioning as a buffer layer may not be obtained. Meanwhile, when the ratio is more than 20%, content of the transition metal element that acts as a redox couple inside the composite oxide is reduced, and as a result, not only the capacity decrease is significant when an electrode is prepared with it but also content of a metal element other than lithium increases, thus the lithium ion diffusion rate inside the composite oxide of lithium and transition metal is lowered, leading to deteriorated output performances.

According to the invention, with regard to the composite oxide of lithium and a transition metal, or at least one metal element other than those, the metal element other than lithium and a transition metal element is segregated on surface of the composite oxide particles and forms an electron-insulating composite oxide layer. As a result, it is possible to lower the electron conduction only in a region which is in contact with a sulfide solid electrolyte without lowering electron conduction inside the composite oxide that acts as an electrode active material. The surface segregation also occurs with the metal element which forms a solid solution with composite oxide of lithium and transition metal, and thus most of the added metal elements are provided as a solid solution in a transition metal site. However, part of them is segregated on the surface, forming an electron-insulating composite oxide layer with lithium.

As a result of surface segregation, concentration of the metal element other than lithium and a transition metal that is present on the surface of the composite oxide is higher than that inside the composite oxide. When the concentration of the metal element is expressed with compositional ratio of the metal element other than the transition metal element and lithium compared to the total composition of the transition metal element that acts as a redox couple in composite oxide and the metal element other than the transition metal element and lithium, in order to form an electron-insulating composite oxide layer for effectively enhancing the output performances of an all solid lithium battery on the surface of composite oxide, the ratio value in a region at which a contact is made with the lithium ion conductive solid electrolyte containing the sulfides as a main component, i.e., on the surface of the composite oxide, is at least five times greater than that of the inside of the composite oxide.

As described before, the invention is based on the finding that, in an all solid lithium battery in which lithium ion conductive solid electrolyte containing a sulfide as a main component and a composite oxide of lithium and transition metal as a cathode active material are used, development of a space charge layer having high resistance developed at an interface between a cathode active material and a sulfide solid electrolyte is a cause for low output performances. Thus, in addition to lithium and transition metal, by introducing a metal element which forms an electron-insulating composite oxide with lithium to the composite oxide of lithium and transition metal, development of the space charge layer can be inhibited. Herein, since the development of a space charge layer that causes impairment of output performance of an all solid lithium battery is more significant as the potential of a cathode active material is more noble, the effect of the invention is significant in an all solid lithium battery in which a cathode active material showing noble potential is used. Specifically, when the transition metal element in the composite oxide exhibits a redox reaction at 3 V or more versus a lithium electrode, particularly significant effect is obtained and also high energy density is obtained from the all solid lithium battery.

As described above, disclosed in the invention is improvement of performances of an all solid lithium battery by adding a metal element to composite oxide of lithium and transition metal that acts as a cathode active material. Regarding the effect obtained from addition of a heterogeneous metal to oxide of lithium and transition metal that acts as a cathode active material, there are various reports, and the effect of replacing with a heterogeneous metal element such as $LiCoO_2$, $LiNiO_2$, and $LiMn_2O_4$ is disclosed to be effective for improving electromotive force or stabilizing a layer structure (Y.-I. Jang, B. Huang, H. Wang, G. R. Maskaly, G. Ceder, D. R. Sadoway, Y.-M. Chiang, H. Liu, H. Tamura, J. Power Sources, 81-82, 589-593 (1999)), or improving a charge and discharge cycle property (Y.-S. Lee, N. Kumada, M. Yoshio, J. Power Sources, 96, 376-384 (2001)), even when only the Al replacement explained in the Examples of the invention is considered. However, the invention is based on the finding of a remarkable effect that, as the added heterogeneous metal forms a segregation layer on surface of the active material and the segregated layer lowers electrode resistance of an all solid lithium battery in which sulfur based solid electrolytes are used, it contributes to obtaining high battery output. Thus, it is completely different from the effects of adding heterogeneous metals that are described in the prior art documents.

EXAMPLES

According to the Example of the invention, an all solid lithium battery was produced by using composite oxide of cobalt, lithium and aluminum as a composite oxide containing a transition metal that acts as a redox couple during operation of an all solid lithium battery, lithium, and at least one metal element other than those, and a solid electrolyte having composition of $Li_2S$—$GeS_2$—$P_2S_5$ as a solid electrolyte that contains a sulfide as a main component.

Composite oxide of cobalt, lithium, and aluminum was synthesized by a solid phase reaction method which uses lithium carbonate ($Li_2CO_3$), cobalt oxide ($Co_3O_4$), and aluminum hydroxide ($Al(OH)_3$) as a starting material. The starting materials were admixed with one another at the molar ratio of 3:2 (1−x):6x (x=0 to 0.25) and heated at 600° C. for 10 hours to perform thermal decomposition of lithium carbonate. After that, it was heated again at 750° C. for 20 hours to synthesize composite oxide represented by $LiCo_{1-x}Al_xO_2$. The calcined product was pulverized and then further heated at 700° C. for 10 hours for promoting formation of a surface segregation layer. As a result, it was obtained as a cathode active material of an all solid lithium battery.

For the synthesis of a lithium ion conductive solid electrolyte containing a sulfide as a main component, $Li_2S$, $GeS_2$, and $P_2S_5$ were used as a starting material. They were admixed with one another in formula weight ratio of 13:2:3, and the mixture was vacuum-sealed in a quartz tube. By heating the mixture at 500° C. for 10 hours, the sulfide based lithium ion conductive solid electrolyte represented by $Li_{3.25}Ge_{0.25}P_{0.75}S_4$ was obtained.

For a cathode of an all solid lithium battery, 10 mg of mixture containing $LiCo_{1-x}Al_xO_2$ and $Li_{3.25}Ge_{0.25}P_{0.75}S_4$ in the weight ratio of 7:3 was used. For an anode, an alloy of indium and lithium was used. For an electrolyte layer, 150 mg of the above-mentioned $Li_{3.25}Ge_{0.25}P_{0.75}S_4$ above was used. They were molded by press to have a three layer structure of cathode/electrolyte layer/anode to give an all solid lithium battery. The all solid lithium battery was charged to 3.58 V with charge and discharge current of 0.05 C and discharged to 2 V, and the discharge curve is given in FIG. 1. Meanwhile, in the present specification, the discharge current of 137 mA/g was taken as 1 C. The discharge capacity obtained from the cathode active material containing no aluminum (x=0) was very small, i.e., 20 mAh/g or less. However, by replacing part of cobalt with aluminum, performances of the battery were improved to show discharge capacity of more than 140 mAh/g when x=0.075.

Figure 2:
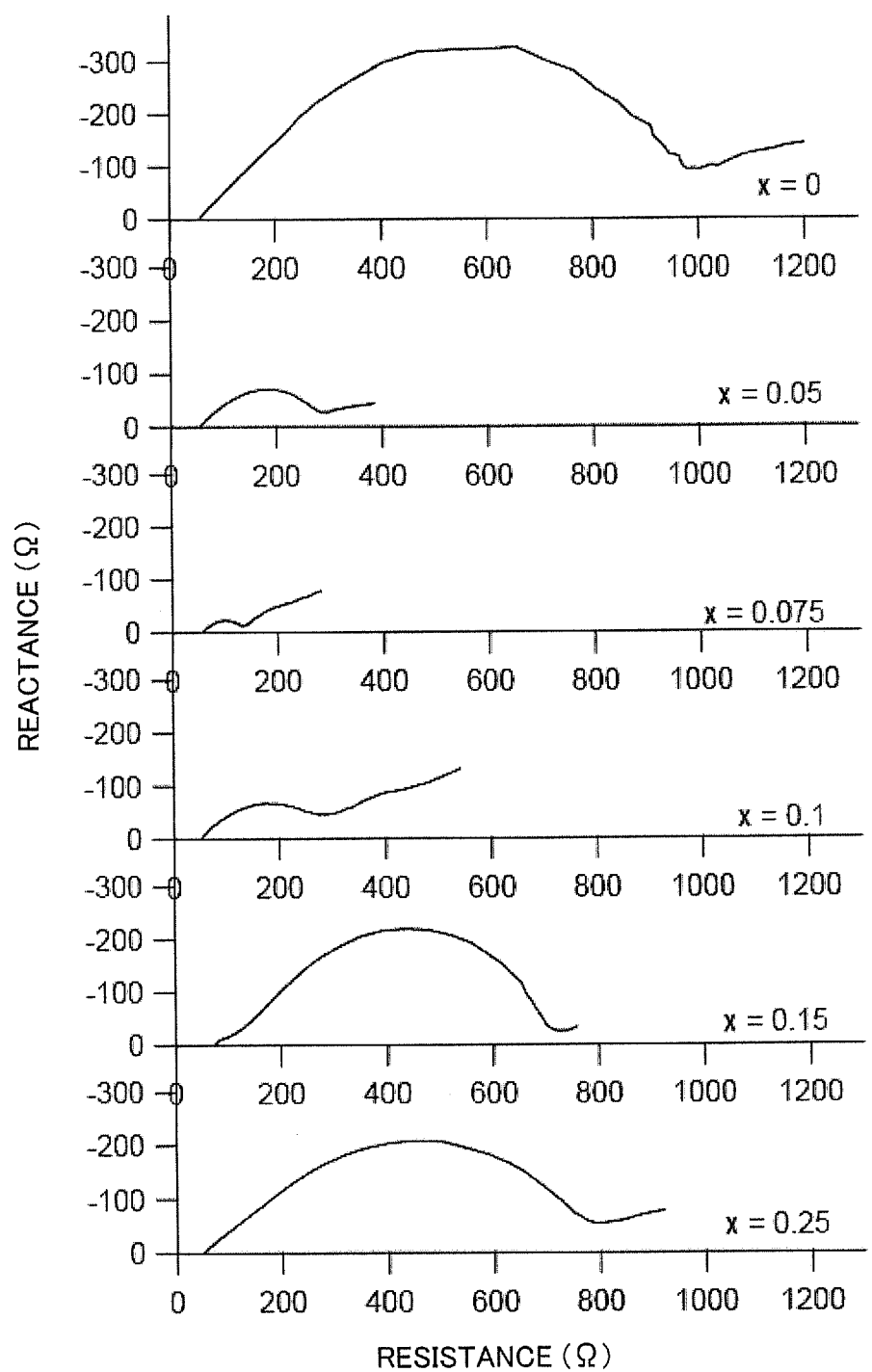
FIG. 2 is a drawing for illustrating the result of examination of internal resistance of an all solid lithium battery according to one Example of the invention, in which examination was made by an AC impedance method. In the figure, "x" represents composition of aluminum in composite oxide and it corresponds to "x" in $LiCo_{1-x}Al_xO_2$ which indicates the composition of composite oxide. Incidentally, the horizontal axis represents resistance of complex impedance and the vertical axis represents reactance of complex impedance.

Further, in FIG. 2, impedance characteristics of the battery that were examined by an AC impedance method after charging the all solid lithium battery are shown. The impedance for the electrode in which part of cobalt was not replaced with aluminum was as high as 1000 kΩ or more. On the other hand, the electrode impedance was lowered according to aluminum replacement, and when x=0.075, it was found to be lowered to about 1/10 or less of the electrode impedance which does not contain any aluminum. That is, it was accordingly found that, in an all solid lithium battery using a lithium ion conductive solid electrolyte containing a sulfide as a main component in which $LiCoO_2$ was used as a cathode active material, by including aluminum in a composite oxide as a cathode active material, internal impedance of the battery could be lowered and also discharge capacity could be increased.

Figure 3:
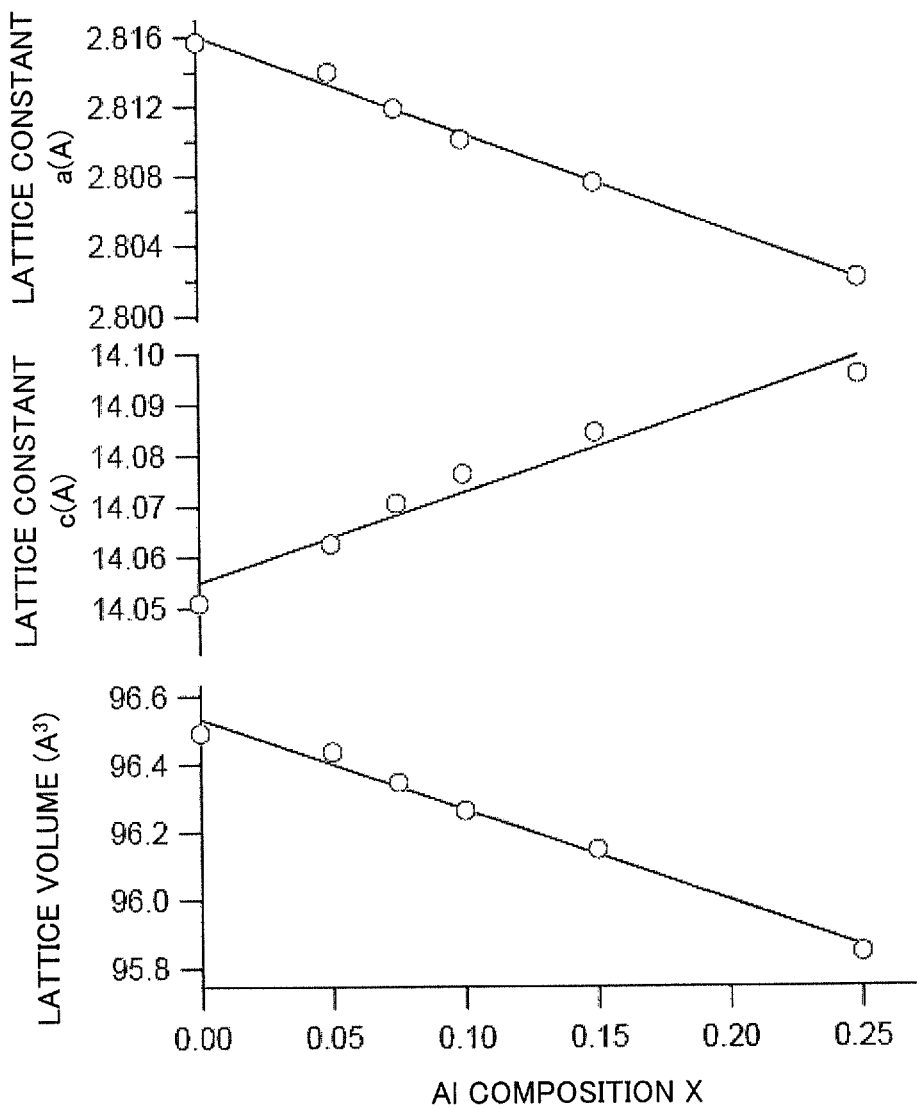
FIG. 3 is a drawing for illustrating the relationship between composition of lithium-cobalt-aluminum composite oxide according to one Example of the invention and crystallographic parameters of the composite oxide. In the figure, "x" represents composition of aluminum in composite oxide and it corresponds to "x" in $LiCo_{1-x}Al_xO_2$ which indicates the composition of composite oxide.

Next, to figure out the cause for having lower resistance, the composite oxide obtained from above was analyzed. First, the composite oxide was analyzed by powder X ray diffraction method. As a result, no impurity phase was detected according to addition of aluminum and, as shown in FIG. 3, Vegard's law was established between the aluminum composition and lattice constant or lattice volume, and therefore it was found that most aluminum was consumed to replace the cobalt site in $LiCoO_2$ and a solid solution represented by $LiCo_{1-x}Al_xO_2$ was formed accordingly.

Figure 4:
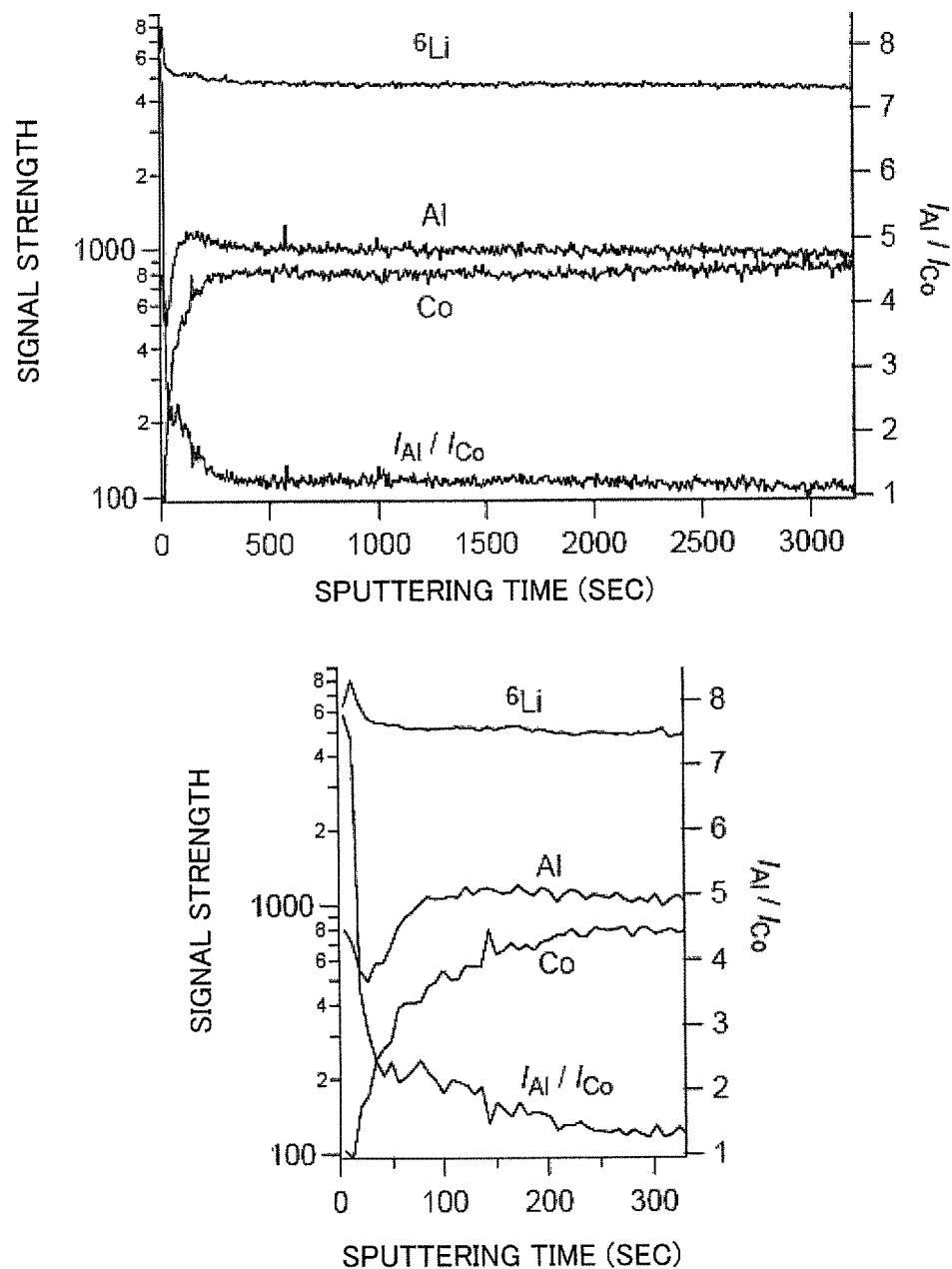
FIG. 4 is a drawing for illustrating the result of examination of composition distribution of lithium-cobalt-aluminum composite oxide according to one Example of the invention, in which examination was made by SIMS. Value 0 for sputtering time indicates surface of a particle and increased sputtering time represents the result of examining the composition inside the particle.

Next, aluminum distribution state in $LiCo_{1-x}Al_xO_2$ particles was examined by secondary ion mass spectrometry (SIMS). When the element distribution was examined by SIMS from the surface of particles while carving the particles by sputtering, it was found that, from the inside of the particles, signals of cobalt and aluminum were obtained with constant strength as shown in FIG. 4, and thus the aluminum was evenly dissolved as a solid in the material. However, it was also confirmed that, on the surface of the particles, signal strength of cobalt was significantly lowered while signal strength of aluminum tended to get increased. Further, according to the drawing at bottom in which data obtained near particle surface were enlarged, the signal strength ratio between aluminum and cobalt ($I_{Al}/I_{Co}$) was approximately 1 for the inside of the particle while it was more than 7 on the surface. Thus, it was clearly shown that, although most of the added aluminum were consumed to replace the cobalt site of $LiCoO_2$ to form a solid solution represented by $LiCo_{1-x}Al_xO_2$, the aluminum was segregated on the particle surface and oxides of lithium and aluminum were formed thereon.

From the results described above, in an all solid lithium battery using as an electrolyte a lithium ion conductive solid electrolyte which contains a sulfide as a main component, when the cathode active material was a composite oxide of cobalt that acted as a redox couple when the all solid lithium battery was under operation, lithium, and at least one metal element other than those, the metal element was aluminum which formed an electron-insulating composite oxide with lithium, and the concentration of the aluminum in a region that was in contact with the sulfide solid electrolyte was higher than the concentration inside the composite oxide, electrode resistance was lowered so that an all solid lithium battery with excellent output performances could be provided.

Example 2

To confirm that the effect of lowering electrode resistance shown in Example 1 could lead to improved output performances, discharge behavior was examined with various discharge current densities.

Figure 5:
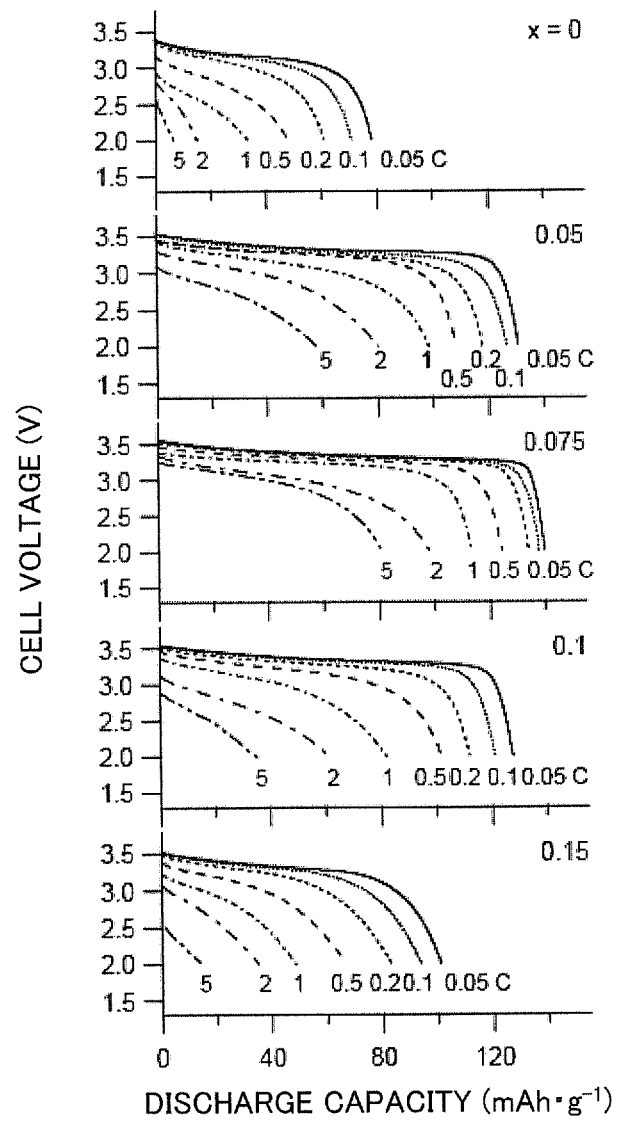
FIG. 5 is a drawing for illustrating the result of examination of discharge characteristics of an all solid lithium battery according to one Example of the invention, in which examination was made by constant current discharge. In the figure, "x" represents composition of aluminum in composite oxide and it corresponds to "x" in $LiCo_{1-x}Al_xO_2$ which indicates the composition of composite oxide.

The all solid lithium battery fabricated in Example 1 was charged to 3.58 V with charge and discharge current of 0.05 C followed by discharge to 2 V with discharge current of from 0.05 C to 5 C. As a result, as shown in FIG. 5, the high rate discharge performances were improved by having $LiCo_{1-x}Al_xO_2$ in which aluminum is included, and almost no discharge capacity was observed for $LiCoO_2$ including no aluminum at the discharge current of 5 C. On the other hand, for the sample in which x=0.075, discharge capacity of 80 mAh/g was observed even at the discharge current of 5 C.

Example 3

It was shown in Example 1 that, in an all solid lithium battery using as an electrolyte a lithium ion conductive solid electrolyte which contains a sulfide as a main component, when the cathode active material was a composite oxide of cobalt that acted as a redox couple when the all solid lithium battery was under operation, lithium, and at least one metal element other than those, and the metal element was aluminum which formed an electron-insulating composite oxide with lithium, the concentration of the aluminum in a region that is in contact with the sulfide solid electrolyte was higher than the concentration inside the composite oxide and electrode resistance was lowered so that an all solid lithium battery with excellent output performances could be provided. In the present Example, to find out more clearly the relationship between aluminum concentration and output performances in a region in contact with the sulfide solid electrolyte, the correlation between performances of an electrode and heating condition carried out for promoting formation of the surface segregation layer of Example 1 was examined.

First, the calcined product of composite oxide represented by $LiCo_{0.925}Al_{0.075}O_2$, which exhibited the highest output performances in Example 1, was produced in the same manner as Example 1. After pulverization, the time for heating at 700° C. for promoting the formation of the surface segregation layer was varied within the range of 1 to 30 hours.

Figure 6:
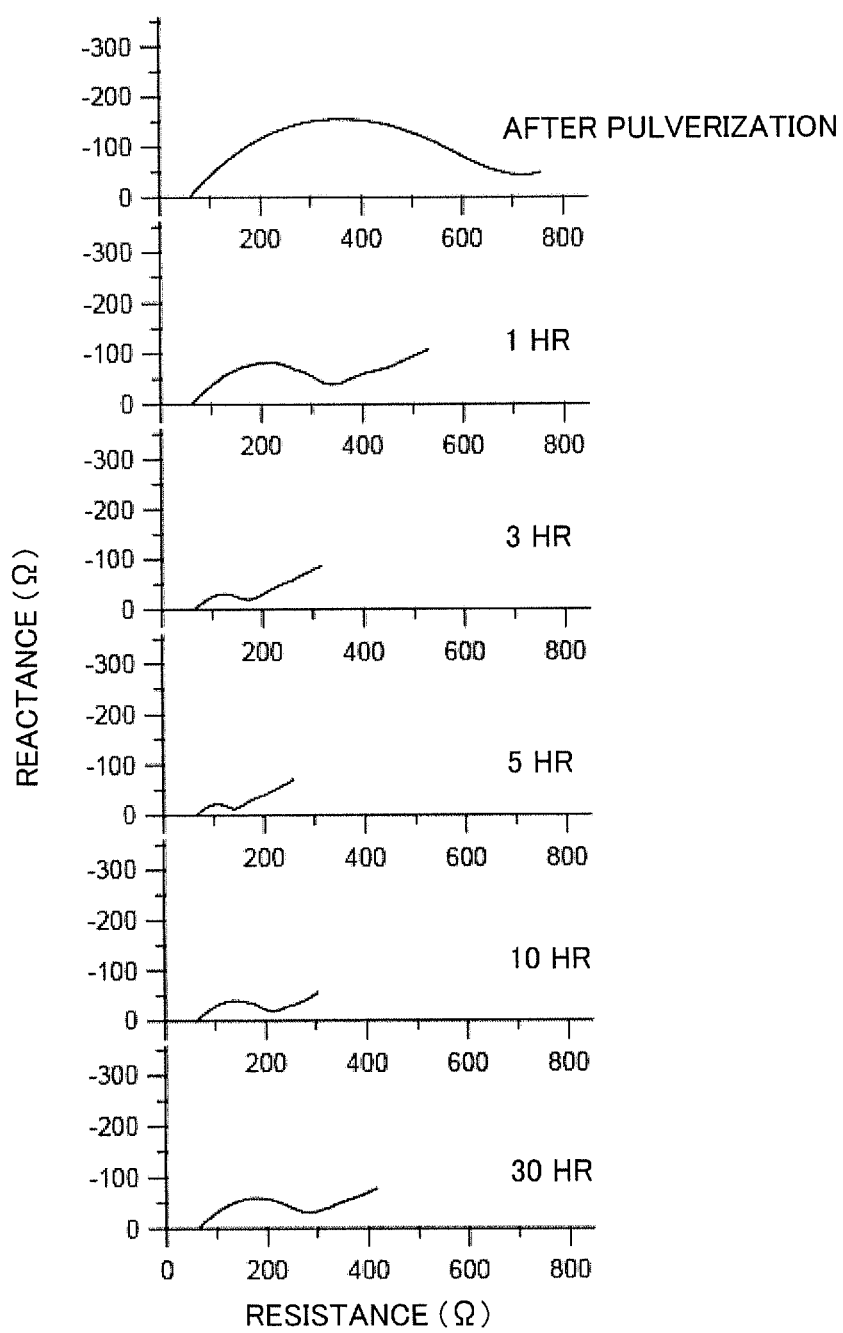
FIG. 6 is a drawing for illustrating the result of examination of internal resistance of an all solid lithium battery according to one Example of the invention, in which examination was made by an AC impedance method. In the figure, time represents the time for heating the pulverized sample at 700° C. Incidentally, the horizontal axis represents resistance of complex impedance and the vertical axis represents reactance of complex impedance.
Figure 7:
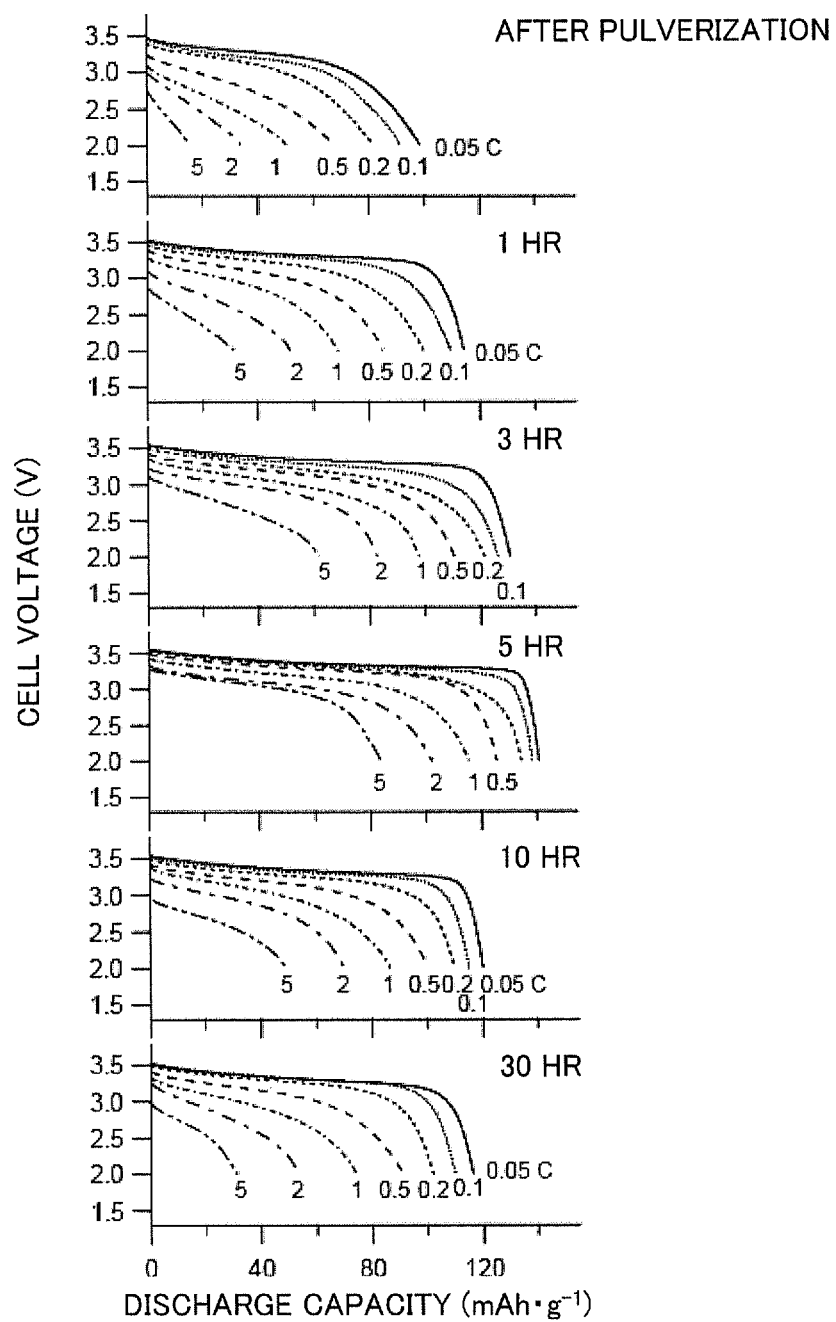
FIG. 7 is a drawing for illustrating the result of examination of discharge characteristics of an all solid lithium battery according to one Example of the invention, in which examination was made by constant current discharge. In the figure, time represents the time for heating the pulverized sample at 700° C.

By using $LiCo_{0.925}Al_{0.075}O_2$ obtained from above, an all solid battery was fabricated in the same manner as Example 1 and the characteristics of the battery were determined in the same manner as Examples 1 and 2. As a result, as shown in FIG. 6, the electrode impedance was decreased in accordance with heating at 700° C. However, after showing the minimum value after heating for 5 hours, it increased again. High rate discharge characteristics on one side were also improved along with the electrode impedance, and as shown in FIG. 7, the all solid battery using $LiCo_{0.925}Al_{0.075}O_2$ that was obtained after heating for 5 hours showed the discharge capacity of 84 mAh/g even at the discharge current of 5 C.

In the present Example, calcined product of the composite oxide represented by $LiCo_{0.925}Al_{0.075}O_2$ was produced, pulverized, and then heated at 700° C. The sample before heating at 700° C. was a result of pulverizing the calcined product, and the particle surfaces were exposed from the inside of calcined product by a pulverization process. Thus, the aluminum concentration on particle surface after pulverization was the same as that inside the calcined product, and as the formation of surface segregation layer was promoted by heating the sample after pulverization, the aluminum concentration on surface was increased as shown in FIG. 4. Therefore, it could be concluded that the improved output performances that are shown in FIGS. 6 and 7 were due to the fact that the concentration of the aluminum on particle surfaces that were in contact with the sulfide solid electrolyte was higher than the concentration inside the composite oxide. Further, it was believed that the slight decrease in output performances that was shown when the heating at 700° C. was carried out for 5 hours or more was caused by excess formation of a surface segregation layer, yielding the output of a battery controlled by resistance of the surface segregation layer.

Figure 8:
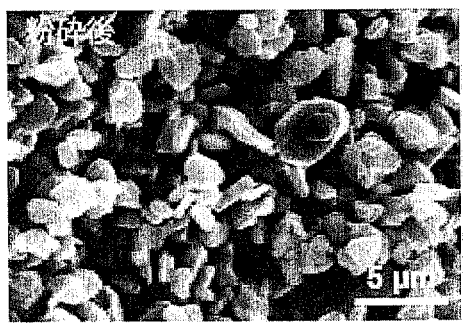
FIG. 8 is a drawing for illustrating the result of examination of shape change when the lithium-cobalt-aluminum composite oxide according to one Example of the invention is heated at 700° C.
Figure 8:
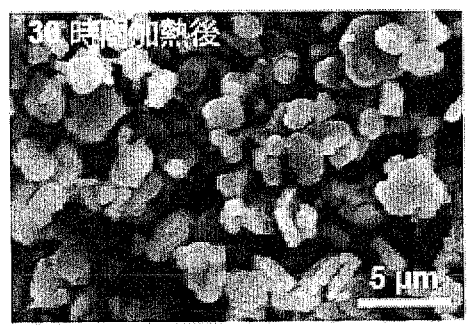
Figure 9:
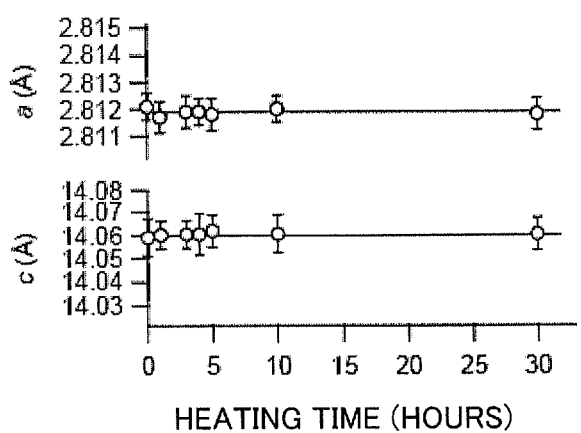
FIG. 9 is a drawing for illustrating the relationship between crystallographic parameter of the lithium-cobalt-aluminum composite oxide according to one Example of the invention and heating time at 700° C.

In FIG. 8, the results of determining a change in particle shape before and after heating at 700° C. were given as measured by SEM. In FIG. 9, the results of determining a change in lattice constant according to heating at 700° C. were given as measured by powder X ray diffraction method. Both the particle shape and lattice constant were not changed by heating at 700° C. It can be concluded that the change in electrode properties upon heating at 700° C. shown in FIGS. 6 and 7 was not caused by the change in particle shape or crystal structure but by the change in aluminum concentration on the particle surfaces.

Comparative Example

As a comparison to Example 3, change in electrode characteristics caused by heating at 700° C. was examined for $LiCoO_2$ containing no aluminum, in accordance with the same manner as Example 3.

Figure 10:
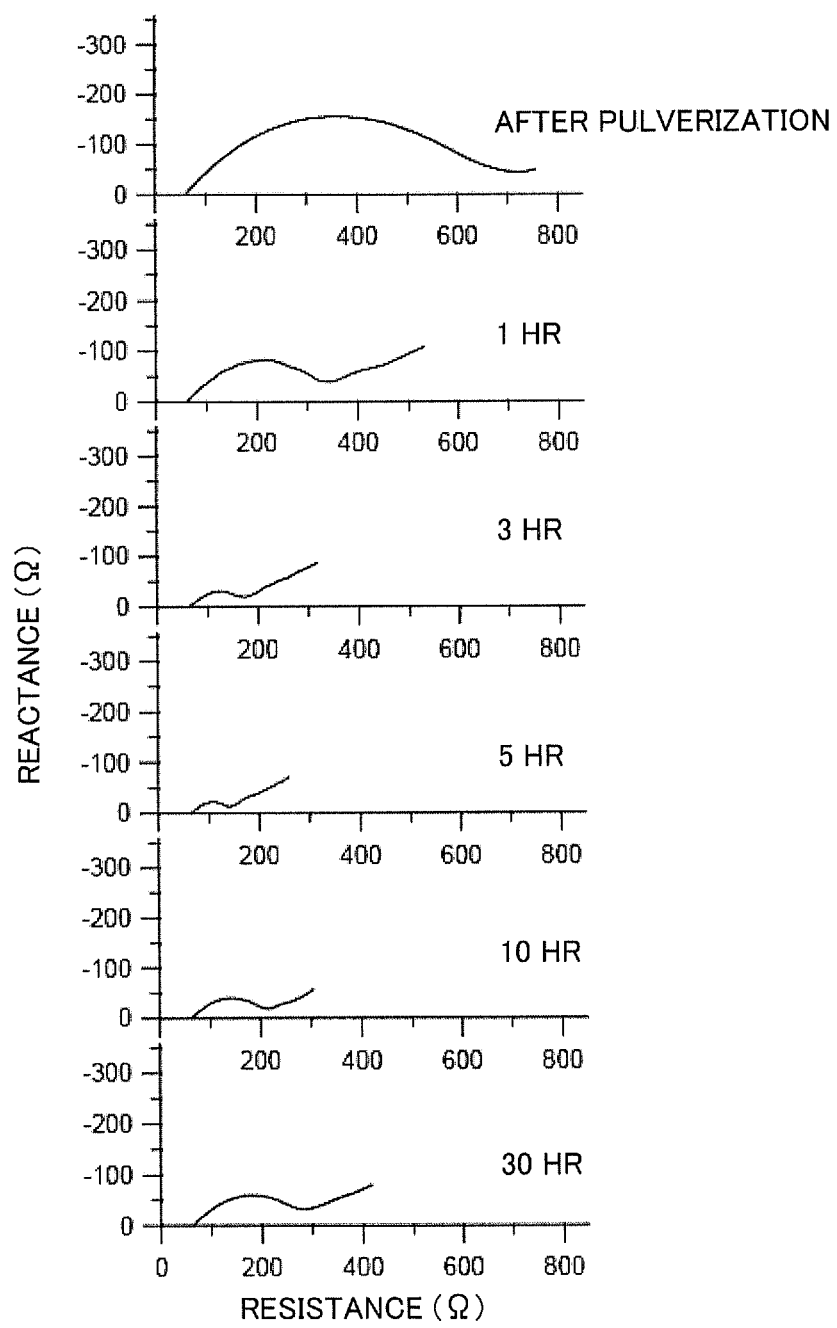
FIG. 10 is a drawing for illustrating the result of examination of internal resistance of an all solid lithium battery according to one Comparative Example of the invention, in which examination was made by an AC impedance method. In the figure, time represents the time for heating the pulverized sample at 700° C. Incidentally, the horizontal axis represents resistance of complex impedance and the vertical axis represents reactance of complex impedance.
Figure 11:
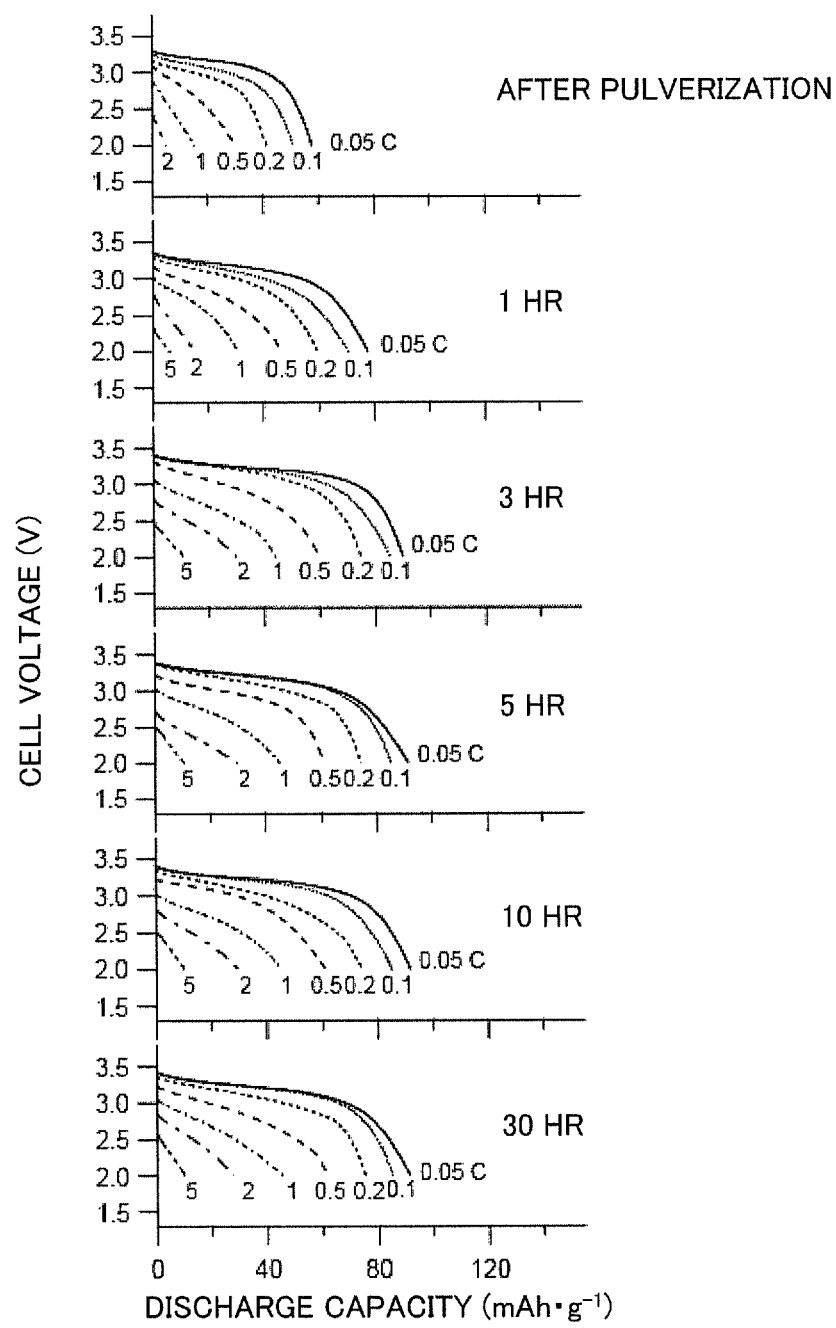
FIG. 11 is a drawing for illustrating the result of examination of discharge characteristics of an all solid lithium battery according to one Comparative Example of the invention, in which examination was made by constant current discharge. In the figure, time represents the time for heating the pulverized sample at 700° C.

As a result, as shown in FIGS. 10 and 11, no significant changes in both the electrode impedance and high rate discharge characteristics were shown after heating for 3 hours, although there was a slight change at initial stage of heating. It was believed that the change in initial stage of heating indicated removal of defects by the heating treatment, in which the defects were introduced during sample pulverization. However, in the $LiCoO_2$ containing no aluminum of Comparative Example, no improvement of output performances was observed and it was clearly shown the improved output performances that were observed in Example 3 were due to the high aluminum concentration on the surface of $LiCo_{0.925}Al_{0.075}O_2$ particles that were in contact with the sulfide solid electrolyte.

Example 4

It was shown from Examples 1 to 3 that, for a case in which a cathode active material was the composite oxide of lithium and a transition metal that acted as a redox couple when the all solid lithium battery was under operation, and at least one metal element other than those, when the transition metal was cobalt and the metal element other than the transition metal and lithium was aluminum, the concentration of the aluminum in the cathode active material was high at a surface that came into contact with the solid electrolyte containing a sulfide as a main component, thus yielding an electrode with low resistance and improved electrode performances. In this Example, to further confirm that high aluminum concentration on the surface had an effect of lowering resistance, a thin film electrode having high surface aluminum concentration was produced by preparing the electrode active material as a thin film and carrying out ion implantation of aluminum near the surface of the thin film, and then electrode behaviors of an all solid lithium battery were examined.

As an electrode active material, the composite oxide of cobalt and lithium expressed by $LiCoO_2$ was used in the same manner as Example 1. Calcined product of $LiCoO_2$ was produced, and by using it as deposit source, $LiCoO_2$ was prepared as a thin film by a pulsed laser deposition. In order to have high concentration aluminum on a surface of the $LiCoO_2$ thin film that had been prepared to have thickness of about 150 nm, ion implantation of aluminum with concentration of $2 \times 10^{15}$ $cm^{-2}$ was carried out on the thin film with low energy (40 keV). Further, to relax the crystal lattice disordered by the ion implantation, it was heated at 500° C. for 1 hour.

Figure 12:
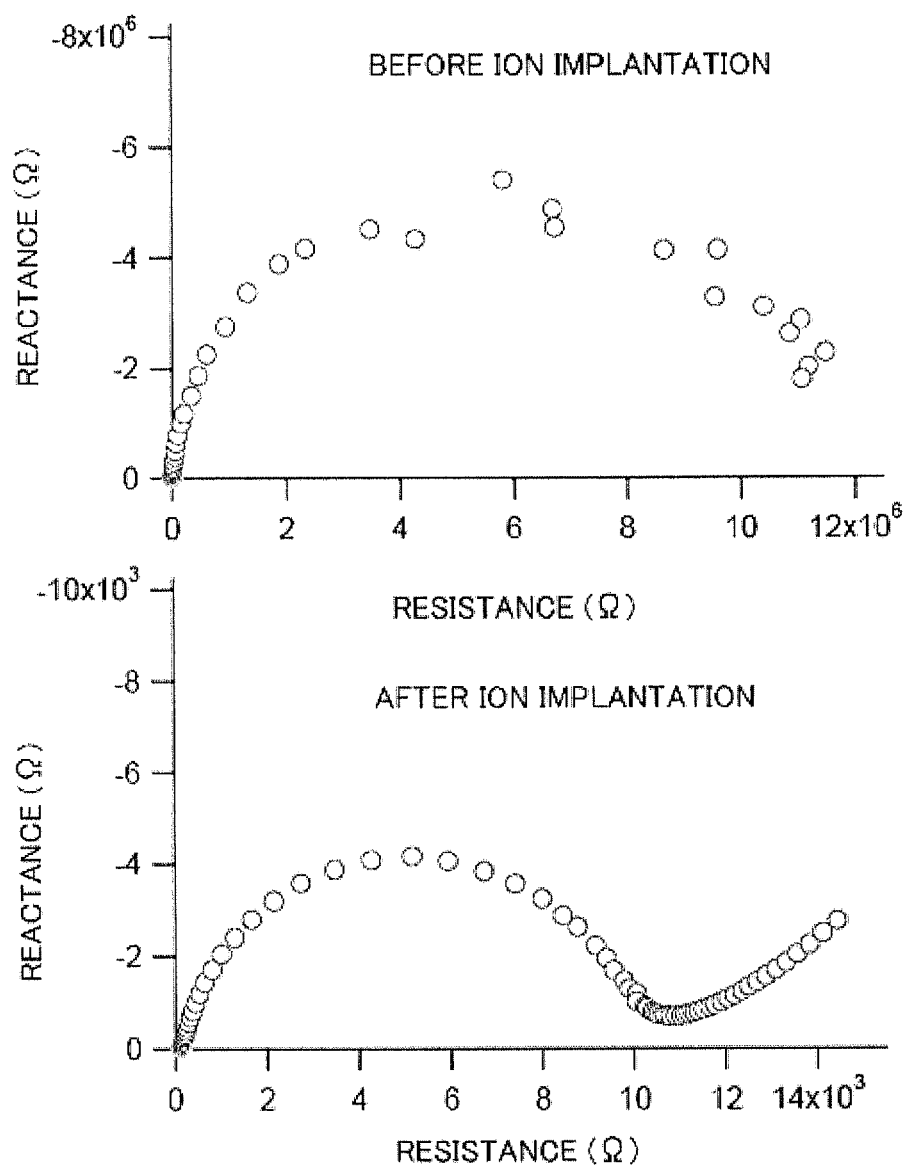
FIG. 12 is a drawing for illustrating the result of examination of internal resistance of an all solid lithium battery according to one Example of the invention, in which examination was made by an AC impedance method.

An all solid lithium battery using $LiCoO_2$ thin film having higher surface aluminum concentration obtained above as a cathode was fabricated in the same manner as Example 1. After charging, internal impedance was examined by an AC method and the results are shown in FIG. 12. Further, in FIG. 12, impedance of an all solid lithium battery in which $LiCoO_2$ thin film prepared without ion implantation of aluminum was used was also shown for a comparison.

Impedance measured from the $LiCoO_2$ thin film which had not been injected with aluminum was as high as $10^7 \Omega$ or so. However, the impedance measured from the $LiCoO_2$ thin film which had been injected with aluminum was $10^4 \Omega$ or so, and therefore it was found that, by carrying out ion implantation of aluminum and increasing aluminum concentration in a region which was in contact with the sulfide solid electrolyte, the electrode resistance was lowered as much as 1/1000.

Example 5

In the present Example, an all solid lithium battery was fabricated in the same manner as Example 1 except that, as a composite oxide of lithium and a transition metal that acted as a redox couple when the all solid lithium battery was under operation, and at least one metal element other than those, composite oxide of nickel, cobalt, lithium, and aluminum was used.

Before synthesis of a composite oxide of nickel, cobalt, lithium, and aluminum, first composite hydroxide of nickel, cobalt, and aluminum was synthesized by coprecipitation. As a nickel source, nickel sulfate ($NiSO_4$) was used. As a cobalt source, cobalt sulfate ($CoSO_4$) was used. As an aluminum source, aluminum nitrate ($Al(NO_3)_3$) was used. An aqueous solution containing them at desired ratio was prepared. Sodium hydroxide (NaOH) was added to the solution, and the precipitates were washed and filtered to obtain composite hydroxide of nickel, cobalt, and aluminum. To the resulting composite hydroxide, lithium hydroxide (LiOH) was further added as a lithium source. By heating for 8 hours at 800° C., composite oxide of nickel, cobalt, lithium, and aluminum represented by $LiNi_{0.8}Co_{0.2-x}Al_xO_2$ was synthesized.

Figure 13:
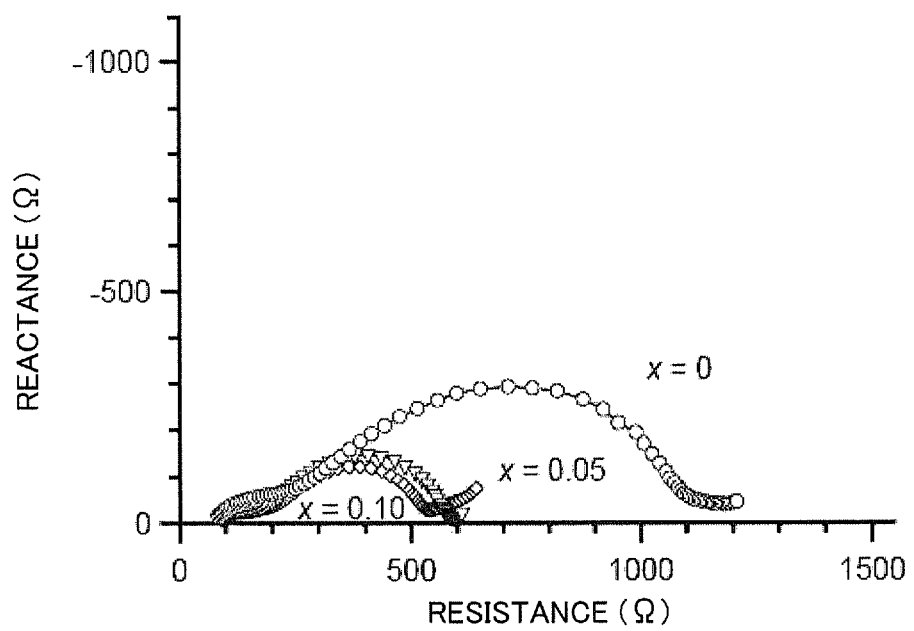
FIG. 13 is a drawing for illustrating the result of examination of internal resistance of an all solid lithium battery according to one Example of the invention, in which examination was made by an AC impedance method. In the figure, "x" represents composition of aluminum in composite oxide and it corresponds to "x" in $LiNi_{0.8}Co_{0.2-x}Al_xO_2$ which indicates the composition of composite oxide.

The all solid lithium battery in which the composite oxide of nickel, cobalt, lithium, and aluminum as obtained from above was used as a cathode active material was charged and then the results of examining the internal impedance by an AC method are shown in FIG. 13. For a case in which the composite oxide contained only the nickel and cobalt which acted as a redox couple under operation of an all solid lithium battery, and lithium the impedance was about 1000Ω. However, for a case in which part of the elements that acted as a redox couple was replaced with aluminum, the impedance was lowered to 500Ω, and thus it was found that, by containing aluminum in the composite oxide as a cathode active material, the internal impedance of a battery could be lowered.

INDUSTRIAL APPLICABILITY

As explained in detail in the above, the invention relates to improvement of output performances of an all solid lithium battery based on an inexpensive configuration with good large scale productivity. Accordingly, it is expected that application range of this type of battery is greatly broadened.

The invention claimed is:

1. An all solid lithium battery, comprising:
   a lithium ion conductive solid electrolyte that is a sulfide solid electrolyte; and
   a cathode active material that is a solid solution containing (i) a transition metal element that acts as a redox couple when the all solid lithium battery is under operation, (ii) lithium, and (iii) at least one metal element other than the transition metal element and lithium,
   wherein:
   the at least one metal element is a metal element capable of forming an electron-insulating oxide with lithium,
   a surface region of the cathode active material is in contact with the lithium ion conductive solid electrolyte,
   a ratio of the at least one metal element to the transition metal element continuously increases from an inner region of the cathode active material toward a surface of the cathode active material,
   the at least one metal element exists throughout the entirety of the cathode active material,
   the at least one metal element is dissolved evenly in the inner region, and
   a compositional ratio of the at least one metal element compared to a total composition of the transition metal element and the at least one metal element is between 0.05 and 0.20.

2. The all solid lithium battery according to claim 1, wherein the at least one metal element is aluminum.

3. The all solid lithium battery according to claim 1, wherein a compositional ratio of the at least one metal element compared to a total composition of the transition metal element and the at least one metal element is at least five times higher in the surface region of the cathode active material than in the inner region of the cathode active material.

4. The all solid lithium battery according to claim 1, wherein the transition metal element exhibits a redox reaction at a potential of 3 V or more versus a lithium electrode.

5. A method for producing the all solid lithium battery of claim 1, the method comprising a step of:
   synthesizing a composite oxide containing the transition metal element, the lithium, and the at least one metal element by solid phase reaction method.

6. The method of claim 5, wherein the method further comprises steps of:
   pulverizing the composite oxide, and
   heating the pulverized composite oxide to form the cathode active material.

* * * * *